(12) United States Patent
Hendrix et al.

(10) Patent No.: US 9,030,315 B2
(45) Date of Patent: May 12, 2015

(54) BINDING METHODS AND DEVICES IN A BUILDING AUTOMATION SYSTEM

(75) Inventors: John A. Hendrix, Grayslake, IL (US); Norman R. McFarland, Palatine, IL (US); Geoffrey D. Nass, Rolling Meadows, IL (US); Jeffrey A. Raimo, Winnetka, IL (US); Pornsak Songkakul, Mequon, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 1564 days.

(21) Appl. No.: 11/846,218

(22) Filed: Aug. 28, 2007

(65) Prior Publication Data

US 2008/0056722 A1 Mar. 6, 2008

Related U.S. Application Data (60) Provisional application No. 60/823,788, filed on Aug. 29, 2006, provisional application No. 60/823,909, filed on Aug. 30, 2006, provisional application No. 60/823,912, filed on Aug. 30, 2006.

(51) Int. Cl.
*G08B 23/00* (2006.01)
*G08C 23/04* (2006.01)
(Continued)

(52) U.S. Cl.
CPC ........ *H04B 10/1149* (2013.01); *G08C 2201/20* (2013.01); *G08C 23/04* (2013.01); *G08C 17/02* (2013.01)

(58) Field of Classification Search
CPC .......... H04B 13/02; H04Q 9/00; G08B 23/00; G08B 25/14
USPC ................ 340/5.39, 571.2, 10.1, 10.3, 12.22, 340/870.01, 517, 539.11, 539.21, 1.1
See application file for complete search history.

(56) References Cited

U.S. PATENT DOCUMENTS

| | | | | |
|---|---|---|---|---|
| 4,200,862 A | * | 4/1980 | Campbell et al. | 340/12.32 |
| 4,418,333 A | * | 11/1983 | Schwarzbach et al. | 340/4.3 |
| 5,086,385 A | * | 2/1992 | Launey et al. | 700/83 |

(Continued)

FOREIGN PATENT DOCUMENTS

| WO | WO 00/43900 A1 | 7/2000 |
|---|---|---|
| WO | WO 03/007665 A1 | 1/2003 |

OTHER PUBLICATIONS

International Search Report dated Aug. 21, 2008 for Application No. PCT/US2007/077107.

(Continued)

*Primary Examiner* — Jennifer Mehmood
*Assistant Examiner* — Rufus Point (57) ABSTRACT

An automation component configured for wireless communication within a building automation system is disclosed. The automation component includes a communication module having a communication port, and a wireless communication component. The automation component further includes a processor in communication with the communication module, a memory in communication with the processor, the memory configured to store computer readable instructions which are executable by the processor. The computer readable instructions are programmed to receive a component identifier via the communications port, generate a binding request based on the received component identifier, and communicate the binding request via the wireless communication component.

24 Claims, 6 Drawing Sheets

(51) Int. Cl.
*H04B 10/114* (2013.01)
*G08C 17/02* (2006.01)

(56) References Cited

U.S. PATENT DOCUMENTS

| | | | | |
|---|---|---|---|---|
| 5,204,768 A * | 4/1993 | Tsakiris et al. | | 398/107 |
| 5,387,993 A * | 2/1995 | Heller et al. | | 398/151 |
| 5,479,408 A * | 12/1995 | Will | | 370/313 |
| 5,530,896 A * | 6/1996 | Gilbert | | 710/9 |
| 5,554,979 A * | 9/1996 | Kohar et al. | | 340/12.53 |
| 5,668,803 A * | 9/1997 | Tymes et al. | | 370/312 |
| 5,675,390 A * | 10/1997 | Schindler et al. | | 715/717 |
| 5,692,214 A * | 11/1997 | Levine | | 710/13 |
| 5,898,831 A * | 4/1999 | Hall et al. | | 726/3 |
| 5,909,183 A * | 6/1999 | Borgstahl et al. | | 340/12.29 |
| 5,917,425 A * | 6/1999 | Crimmins et al. | | 340/8.1 |
| 5,973,810 A * | 10/1999 | Song | | 398/112 |
| RE36,530 E * | 1/2000 | Heller et al. | | 398/40 |
| 6,229,433 B1 * | 5/2001 | Rye et al. | | 340/12.5 |
| 6,424,623 B1 * | 7/2002 | Borgstahl et al. | | 370/230 |
| 6,424,660 B2 * | 7/2002 | Jacobson, Jr. | | 370/475 |
| 6,434,158 B1 * | 8/2002 | Harris et al. | | 370/401 |
| 6,434,159 B1 * | 8/2002 | Woodward et al. | | 370/401 |
| 6,567,032 B1 * | 5/2003 | Mullaly et al. | | 341/176 |
| 6,574,234 B1 * | 6/2003 | Myer et al. | | 370/462 |
| 6,653,933 B2 * | 11/2003 | Raschke et al. | | 370/203 |
| 6,735,630 B1 * | 5/2004 | Gelvin et al. | | 709/224 |
| 6,779,004 B1 * | 8/2004 | Zintel | | 709/227 |
| 6,795,404 B2 * | 9/2004 | Slemmer et al. | | 370/270 |
| 6,823,223 B2 * | 11/2004 | Gonzales et al. | | 700/86 |
| 6,856,236 B2 * | 2/2005 | Christensen et al. | | 340/3.5 |
| 6,865,427 B2 * | 3/2005 | Brown et al. | | 700/19 |
| 6,879,806 B2 * | 4/2005 | Shorty | | 455/11.1 |
| 6,901,439 B1 * | 5/2005 | Bonasia et al. | | 709/220 |
| 6,961,541 B2 * | 11/2005 | Overy et al. | | 455/41.2 |
| 6,972,677 B2 * | 12/2005 | Coulthard | | 340/531 |
| 6,980,080 B2 * | 12/2005 | Christensen et al. | | 340/3.5 |
| 6,993,417 B2 * | 1/2006 | Osann, Jr. | | 700/291 |
| 7,024,256 B2 * | 4/2006 | Krzyzanowski et al. | | 700/65 |
| 7,026,949 B2 * | 4/2006 | Lee et al. | | 340/9.1 |
| 7,064,675 B2 * | 6/2006 | Zigmond et al. | | 340/12.53 |
| 7,072,671 B2 * | 7/2006 | Leitch | | 455/456.1 |
| 7,072,945 B1 * | 7/2006 | Nieminen et al. | | 709/217 |
| 7,102,502 B2 * | 9/2006 | Autret | | 340/505 |
| 7,123,128 B2 * | 10/2006 | Mullet et al. | | 340/5.71 |
| 7,142,128 B2 * | 11/2006 | Kobayashi | | 709/218 |
| 7,200,643 B2 * | 4/2007 | Latvakoski et al. | | 709/217 |
| 7,342,895 B2 * | 3/2008 | Serpa et al. | | 370/254 |
| 7,561,019 B2 * | 7/2009 | Sasakura et al. | | 340/5.1 |
| 7,605,696 B2 * | 10/2009 | Quatro | | 340/539.13 |
| 7,649,456 B2 * | 1/2010 | Wakefield et al. | | 340/539.13 |
| 7,671,758 B1 * | 3/2010 | Seidel et al. | | 340/12.28 |
| 7,698,448 B2 * | 4/2010 | Reckamp et al. | | 709/230 |
| 7,733,224 B2 * | 6/2010 | Tran | | 340/540 |
| 7,768,420 B2 * | 8/2010 | Neogi et al. | | 340/12.53 |
| 8,063,749 B2 * | 11/2011 | Rye et al. | | 340/12.5 |
| 8,223,001 B2 * | 7/2012 | Sutardja | | 340/12.22 |
| 8,344,859 B2 * | 1/2013 | Reams et al. | | 340/12.28 |
| 2002/0029256 A1 * | 3/2002 | Zintel et al. | | 709/218 |
| 2002/0044042 A1 * | 4/2002 | Christensen et al. | | 340/3.54 |
| 2002/0169914 A1 * | 11/2002 | Shteyn | | 710/305 |
| 2003/0020595 A1 * | 1/2003 | Wacyk | | 340/3.5 |
| 2003/0109270 A1 * | 6/2003 | Shorty | | 455/517 |
| 2003/0220114 A1 * | 11/2003 | Langensteiner et al. | | 455/450 |
| 2003/0229900 A1 * | 12/2003 | Reisman | | 725/87 |
| 2005/0085248 A1 * | 4/2005 | Ballay et al. | | 455/500 |
| 2005/0085930 A1 * | 4/2005 | Gonzales et al. | | 700/86 |
| 2005/0086366 A1 * | 4/2005 | Luebke et al. | | 709/238 |
| 2005/0194456 A1 * | 9/2005 | Tessier et al. | | 236/51 |
| 2006/0063522 A1 * | 3/2006 | McFarland | | 455/423 |
| 2006/0092037 A1 | 5/2006 | Neogi et al. | | |
| 2006/0099971 A1 * | 5/2006 | Staton et al. | | 455/456.6 |
| 2006/0143292 A1 | 6/2006 | Taubenheim et al. | | |
| 2006/0200253 A1 * | 9/2006 | Hoffberg et al. | | 700/19 |
| 2006/0238337 A1 * | 10/2006 | Minassian et al. | | 340/539.23 |
| 2007/0053513 A1 * | 3/2007 | Hoffberg | | 380/201 |
| 2008/0057872 A1 * | 3/2008 | McFarland et al. | | 455/66.1 |
| 2008/0242314 A1 * | 10/2008 | McFarland | | 455/456.1 |
| 2010/0076642 A1 * | 3/2010 | Hoffberg et al. | | 701/29 |

OTHER PUBLICATIONS

Canadian Office Action dated Mar. 26, 2014 for corresponding Canadian Patent Application No. 2,836,941.

* cited by examiner

BINDING METHODS AND DEVICES IN A BUILDING AUTOMATION SYSTEM

CROSS REFERENCE TO RELATED APPLICATIONS

This patent claims the priority benefit under 35 U.S.C. §119(e) of U.S. provisional patent application Ser. No. 60/823,788, filed on Aug. 29, 2006, entitled "MANUAL BINDING METHODS OF WIRELESS DEVICES IN A BUILDING AUTOMATION SYSTEM"; U.S. provisional patent application Ser. No. 60/823,909, filed on Aug. 30, 2006, entitled "MANUAL BINDING OF WIRELESS DEVICES IN A BUILDING AUTOMATION SYSTEM USING IR PORTS"; and U.S. provisional patent application Ser. No. 60/823,912, filed on Aug. 30, 2006, entitled "MANUAL BINDING OF WIRELESS DEVICES IN A BUILDING AUTOMATION SYSTEM USING BAR CODES", the contents of which are incorporated herein in its entirety for all purposes.

BACKGROUND

The present disclosure generally relates to building automation systems. In particular, the present disclosure relates to methods and devices for manually binding or linking automation components within a building automation system.

A building automations system (BAS) typically integrates and controls elements and services within a structure such as the heating, ventilation and air conditioning (HVAC) system, security services, fire systems and the like. The integrated and controlled systems are arranged and organized into one or more floor level networks (FLNs) containing application or process specific controllers, sensors, actuators, or other devices distributed or wired to form a network. The floor level networks provide general control for a particular floor or region of the structure. For example, a floor level network may be an RS-485 compatible network that includes one or more controllers or application specific controllers configured to control the elements or services within floor or region. The controllers may, in turn, be configured to receive an input from a sensor or other device such as, for example, a temperature sensor (RTS) deployed to monitor the floor or region. The input, reading or signal provided to the controller, in this example, may be a temperature indication representative of the physical temperature. The temperature indication can be utilized by a process control routine such as a proportional-integral control routine executed by the controller to drive or adjust a damper, heating element, cooling element or other actuator towards a predefined set-point.

Information such as the temperature indication, sensor readings and/or actuator positions provided to one or more controllers operating within a given floor level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included floor level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157, filed on Oct. 31, 2006, and co-pending U.S. patent application Ser. No. 10/915,034, filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a floor level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

Wireless devices for use within the building automation system must be configured in order to establish communications with the different elements, components and networks that comprise the building automation system. Systems and method for configuring and establishing communications between the wireless devices and the automation components may be desirable and facilitate the setup, configuration, maintenance and operation of the building automation system.

SUMMARY

The present disclosure generally provides for manually binding wireless devices and/or automation components operating within a building automation system (BAS). Wireless devices and/or automation components need to be bound, linked or otherwise joined in order to communicate with each other. Generally the disclosed devices and methods are configured to wirelessly communicate information, identifiers and requests configured to establish binding relationships there between.

In one embodiment, an automation component configured for wireless communication within a building automation system is disclosed. The automation component includes a communication module having a communication port, and a wireless communication component. The automation component further includes a processor in communication with the communication module, a memory in communication with the processor, the memory configured to store computer readable instructions which are executable by the processor. The computer readable instructions are programmed to receive a component identifier via the communications port, generate a binding request based on the received component identifier, and communicate the binding request via the wireless communication component.

In another embodiment, a method for binding an automation component within a building automation system is disclosed. The method includes receiving a component identifier via a communication port, generating a binding request based on the received component identifier, and communicating the binding request via a wireless communication component, wherein the binding request is addressed to the received component identifier.

In another embodiment, an automation component configured for wireless communication within structure having a building automation system is disclosed. The automation component includes a wireless communications component, a processor in communication with the wireless communications component, a memory in communication with the processor, the memory configured to store computer readable instructions which are executable by the processor. The computer readable instructions are programmed to receive a location signal, receive a signal strength indicator, and determine a position within the structure as a function of the location signal and the signal strength indicator.

In another embodiment, an automation component configured for wireless communication within structure having a building automation system is disclosed. The automation component includes a wireless communication component, a location communication component in communication with the wireless communication component, wherein the location component is configured to provide a location signal, and a signal strength indication component in communication with the wireless communication component, wherein the location component is configured to provide a signal strength indicator.

In another embodiment, a method for binding an automation component within a building automation system is disclosed. The method includes receiving a location signal communicated by a location communication component, receiving a signal strength indicator communicated by the location communication component, determining a position as a function of the location signal and the signal strength indicator, and communicating a binding request to a second automation component within a communication range associated with the position.

Additional features and advantages of the present invention are described in, and will be apparent from, the following Detailed Description and the figures.

BRIEF DESCRIPTION OF THE FIGURES

The method, system and teaching provided relate to binding automation components within a building automation system (BAS).

DETAILED DESCRIPTION

The embodiments discussed herein include automation components, wireless devices and transceivers. The devices may be IEEE 802.15.4/ZigBee-compliant automation components such as: a personal area network (PAN) coordinator which may be implemented as a field panel transceivers (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein.

I. Building Automation System Overview

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as known wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be utilized for industrial control and sensing applications such as building automation. Thus, automation components configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 standard compliant port with an RJ11 or other type of connector, an RJ45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b . . . 802.11n, etc.) These exemplary wired, wireless devices may further include a man-machine interface (MMI) such as a web-based interface screen that provide access to configurable properties of the device and allow the user to establish or troubleshoot communications between other devices and elements of the BAS.

Figure 1:
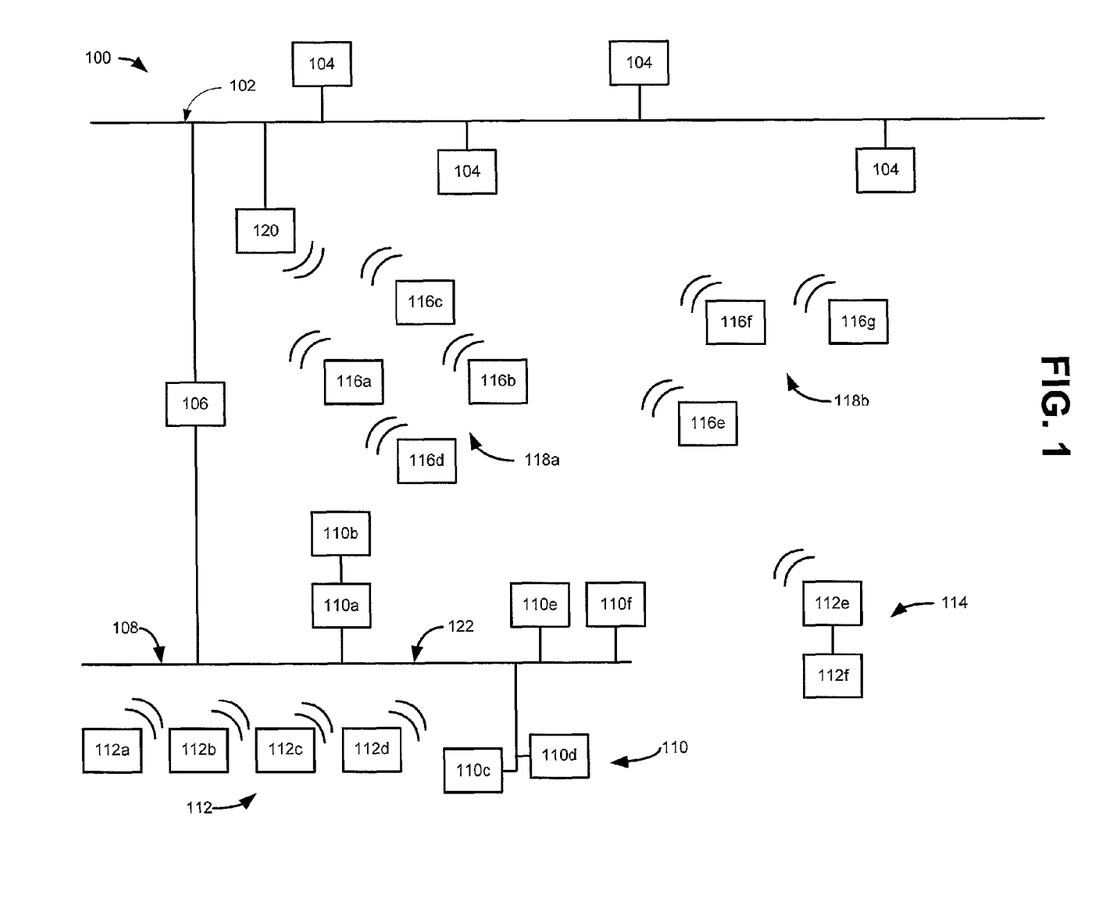
FIG. 1 illustrates an embodiment of a building automation system configured in accordance with the disclosure provided herein.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a floor level network (FLN). The second network 108, in this exemplary embodiment, may include a wired network 122 that connects to building automation components 110 (individually identified as automation components 110a to 110f). The second network 108 may further be coupled to wireless building automation components 112. For example, the building automation components 112 may include wireless devices individually identified as automation components 112a to 112f. In one embodiment, the automation component 112f may be a wired device that may or may not include wireless functionality and connects to the automation component 112e. In this configuration, the automation component 112f may utilize or share the wireless functionality provided by the automation component 112e to define an interconnected wireless node 114.

The control system 100 may further include automation components generally identified by the reference numerals 116a to 116g. The automation components 116a to 116g may be configured or arranged to establish one or more networks or subnets 118a and 118b. The automation components 116a to 116g such as, for example, full or reduced function devices and/or a configurable terminal equipment controller (TEC), cooperate to wirelessly communicate information between the second network 108, the control system 100 and other devices within the mesh networks or subnets 118a and 118b. For example, the automation component 116a may communicate with other automation components 116b to 116d within the mesh network 118a by sending a message addressed to the network OR component identifier, alias and/or media access control (MAC) address assigned to each of the interconnected automation components 116a to 116g and/or to a field panel 120. In one configuration, the individual automation components 116a to 116d within the subnet 118a may communicate directly with the field panel 120 or, alternatively, the individual automation components 116a to 116d may be configured in a hierarchal manner such that only one of the components for example, automation component 116c, communicates with the field panel 120. The automation components 116e to 116g of the mesh network 118b may, in turn, communicate with the individual automation components 116a to 116d of the mesh network 118a or the field panel 120.

The automation components 112e and 112f defining the wireless node 114 may wirelessly communicate with the second network 108, and the automation components 116e to 116g of the mesh network 118b to facilitate communications between different elements, section and networks within the control system 100. Wireless communication between individual the automation components 112, 116 and/or the subnets 118a, 118b may be conducted in a direct or point-to-point manner, or in an indirect or routed manner through the nodes or devices comprising the nodes or networks 102, 108, 114 and 118. In an alternate embodiment, the wired network 122 is not provided, and further wireless connections may be utilized.

Figure 2:
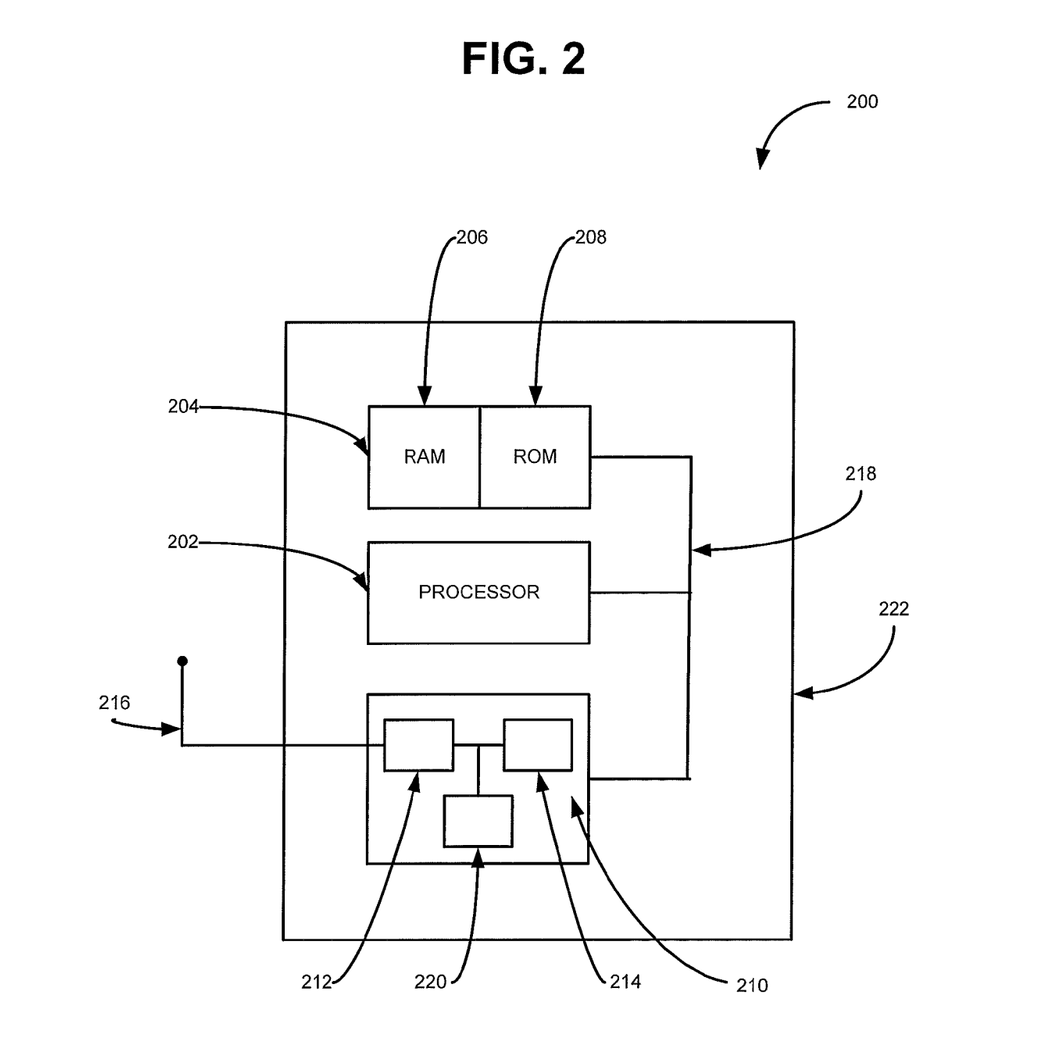
FIG. 2 illustrates an embodiment of a wireless device or automation component that may be utilized in connection with the building automation system shown in FIG. 1.

FIG. 2 illustrates an exemplary automation component 200 that may be utilized within the control system 100. The automation component 200 maybe be a full function device or a reduced function device and may be utilized interchangeably with the automation components 110, 112 and 116 shown and discussed in connection with FIG. 1. The automation component 200 in this exemplary embodiment may include a processor 202 such as an INTEL® PENTIUM® class processor in communication with a memory 204 or storage medium. The memory 204 or storage medium may contain random access memory (RAM) 206, flashable or non-flashable read only memory (ROM) 208 and/or a hard disk drive (not shown), or any other known or contemplated storage device or mechanism. The automation component may further include a communications module 210. The communications module 210 may include, for example, the ports, hardware and software necessary to implement wired communications with the control system 100. The communications module 210 may alternatively, or in addition to, contain a wireless transmitter 212 and a receiver 214 communicatively coupled to an antenna 216 or other broadcast hardware.

The communication module 210 may further include a communication port 220. The communication port 220 may be an infrared (IR) port configured to communicate, e.g., transmit and/or receive, information. For example, many known personal digital assistants (PDAs) include IR ports for communications and may be configured to store and communicate component identifiers such as, for example, MAC addresses, via the IR port. In another embodiment, communication port 220 may be a serial port compliant with, for example, RS-232 and/or RS-422 standards and may utilize, for example, a 25-pin D-type connector. In this example, the serial port may cooperate with a serial cable (not shown) to exchange or communicate information between the automation component 200 and another automation component 110, 112 and 116. Alternatively, the serial cable may be a "smart" cable that includes a controller (not shown) having a processor and/or a memory. The smart cable may be configured to initiate communications between the automation component 200 and another automation component 110, 112 and 116 in order to exchange component identifiers.

The sub-components 202, 204 and 210 of the exemplary automation component 200 may be coupled and able to share information with each other via a communications bus 218. In this way, computer readable instructions or code such as software or firmware may be stored on the memory 204. The processor 202 may read and execute the computer readable instructions or code via the communications bus 218. The resulting commands, requests and queries may be provided to the communications module 210 for transmission via the transmitter 212 and the antenna 216 to other automation components 200, 112 and 116 operating within the first and second networks 102 and 108.

II. Automation Component Binding

Figure 3:
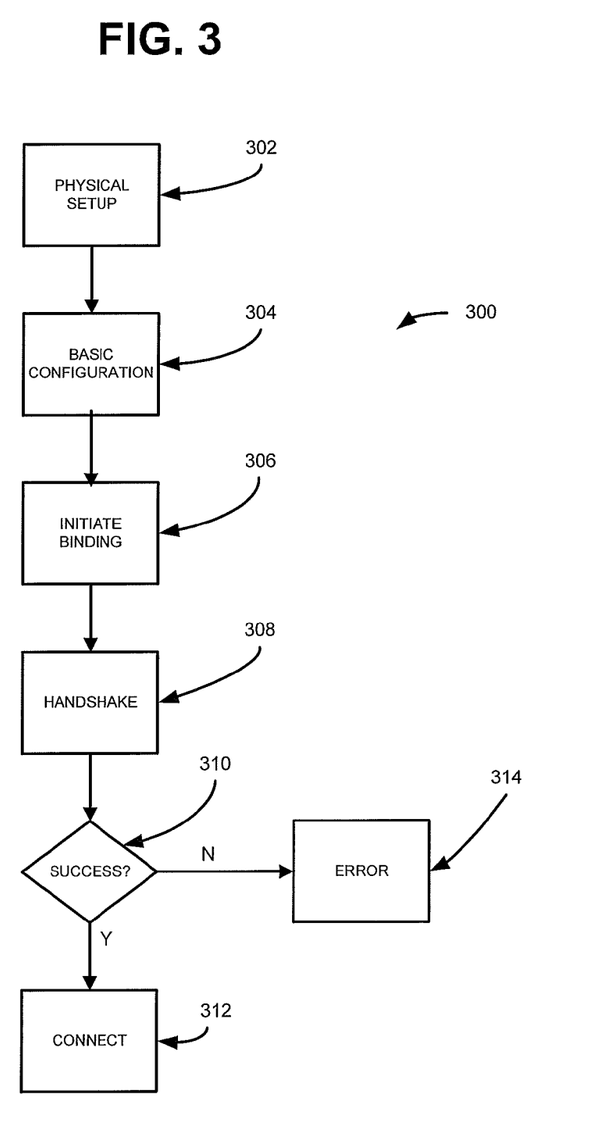
FIG. 3 illustrates an exemplary flowchart representative of an exemplary binding operation.

FIG. 3 illustrates an overview of a wireless binding operation or procedure 300 that may be implemented between one or more of the exemplary automation components 200 (see FIG. 2), the automation components 110, 112 and 116 (see FIG. 1) and/or a terminal equipment controller (TEC), other full function devices, a workstation 104, etc. within the control system 100. The binding operation may be utilized to augment binding operations in which devices within the control system 100 are physically connected or wired together to define the networks 102, 108 and subnets 118a, 118b of the control system 100. Binding as used herein describes the logical and communications relationship utilized to join or link devices, components and elements within the control system 100.

At block 302, one or more of the automation components, for example, the automation components 200, 112 and 116, to be bound together or with other components, elements or subsystems of the control system 100 may be physically setup or emplaced within the structure. While all of the automation components 200, 112 and 116 may be utilized interchangeably with the teachings disclosed herein, the automation component 200 will be referred to herein for convenience and clarity. The physical setup may include mounting or otherwise positioning the automation component 200 within a given region or area or a structure to be monitored. For example, if the automation component 200 is a wireless room temperature sensor (WRTS), it may be positioned within an area of the structure in which the temperature is to be monitored.

The physical setup may further include positioning or mounting the automation component 200 within a specific distance or range of another automation component 200 and/or other full function or reduced function devices operating within the control system 100. For example, in order to establish the subnet 118b, the automation component 200 may be positioned within two hundred feet (200 ft) or approximately sixty meters (60 m) of another component or device. The physical setup may further include: ensuring broadcast or line-of-site communications around the mounting position for the automation component 200, checking or monitoring the power source of the automation component 200, e.g., verifying the fuel cell, battery, line power, magnetic resonance receiver, measuring or recording the communication or broadcast signal strengths or power within the area, etc.

In another embodiment, the physical setup can include creating a map or diagram of the automation components 200, 110, 112 and 116 disposed and secured throughout the structure controlled and monitored by the control system 100. The map may include the physical location, device type, configuration and communication or broadcast signal strength or power of the automation component 200, 110, 112 and 116 within the area of the structure to be monitored.

At block 304, the basic configuration, logical setup or commissioning of the automation component 200 may be established. The basic configuration may include assigning a component identifier, a network name or alias, a media access control (MAC) address, a network or subnet password, etc. In one embodiment, the automation component 200 may be configured with a list or database of information detailing the component's communication schedule, other devices or components in the control system 100 to which communications should be established, communications or information priorities, etc. The basic configuration may be accomplished by way of a direct, e.g., wired, infrared, etc., connection between a portable device 400 (see FIG. 4) such as a laptop, a personal digital assistant, a universal remote control, a barcode reader or scanner, etc. Alternatively, each automation component 200 may be assigned a unique component identifier or identification such as a hexadecimal code or string. For example, if the portable device 400 is a universal remote control, a numeric or hexadecimal number representing the component identifier may be communicated to the automation component 200 via either a wireless connection such as a radiofrequency (RF) connection and/or an infrared (IR) connection. The assigned component identifier, allows the portable device 400 and/or another automation component 110, 112 and 116 to communicate with the automation component 200.

At block 306, the portable device 400 may further be utilized in cooperation with the now-configured automation component 200 to initiate a binding sequence between the component and one or more devices operating within the control system 100 utilizing the component identifier. For example, the portable device 400 may be a laptop computer having a communications program such as, for example, WINDOWS® HyperTerminal or other man machine interface (MMI), into which a bind initiate command may be entered and provided to the automation component 200. The bind initiate command may include the component identifier, identification and/or alias of, for example, the terminal equipment controller, full function device or network, to which the automation component 200 is to be bound.

In another embodiment, the communication port 220 of the automation component 200 may be an infrared port configured for communications with the portable device 400 discussed above. In particular, the infrared port 220 may transmit or provide setup information such as the component identifier associated with the automation component 200 stored within the memory 204 to the portable device 400 such as a personal digital assistant, a laptop and/or a universal remote control configured to receive and store the information. The provided component identifier may, in turn, be communicated to another automation component 110, 112 and 116 to which the automation component 200 is to be joined. For example, if the portable device 400 is a universal remote control or personal digital assistant, the stored component identifier may be communicate via infrared to the infrared port of another automation component 110, 112, 116. The exchanged component identifier may allow the automation component 200 to join or communicate with a second component and establish a binding relationship therebetween.

In another embodiment, the automation component 200, and more particularly, the component housing 222 (see FIG. 2), may carry a barcode or other machine readable label 502 (see FIG. 5). In this way, the portable device 400 which, in this configuration, includes a bar code scanner can read or scan the barcode 502 affixed to the component housing 222. The barcode 502 or machine readable label may be arranged or configured to represent the setup information associated with the automation component 200. In this way, the barcodes 502 associated with one or more automation components 200, 110, 112 and 116 may be scanned for setup information including, but not limited to, the component identifier, and the information may be communicated or provided to one or more automation components, full function devices and/or terminal equipment controllers to which a binding relationship is to be established.

At block 308, the automation component 200, in response to a received bind initiate command, attempts to contact designated the terminal equipment controller, full function device or network utilizing the component identifier provided by the portable device 400. The communication attempt may query or challenge the designated device and upon receipt of a response establish a connection between the automation component 200 and the designated device. For example, the automation component 200 may initiate a handshake query or communication with the terminal equipment control to which it is to be bound. The handshake or challenge may be a timed communication such that a response must be received by the transmitting automation component 200 within a given time period, e.g., ten (10) seconds, or else the communication will be denied.

At block 310, the status of the communication attempt may be evaluated. If the communication is successful, e.g., the response was received within the allowed time period, the response includes the proper information, password, etc., and/or the response is provided in the proper format, then at block 312, the connection is established between the automation component 200 and the designated device. However, if the communication is not successful, e.g., the response was delayed, the response is incorrect or in provided in an improper format, then at block 314, the connection is not established and an error is generated. The error, in turn, may be communicated to the portable device and displayed via the HyperTerminal program. In another embodiment, the automation component 200 may include indicators such as, for example, light emitting diodes (LEDs) to provide a visual indication of successful or failed communication attempts.

Figure 4A:
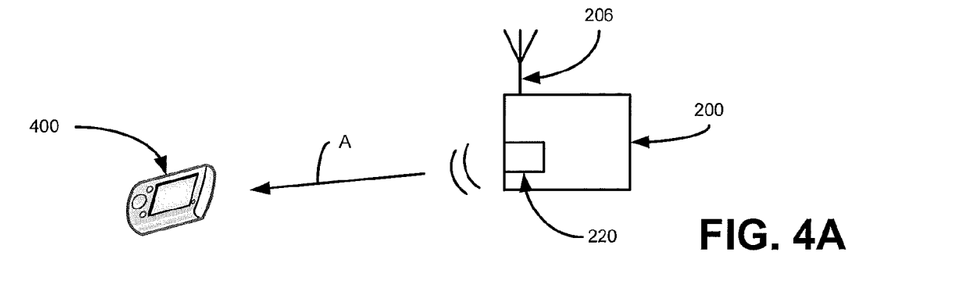
FIGS. 4A and 4B illustrate an exemplary binding operation that may be implemented in connection with the building automation system shown in FIG. 1.
Figure 4B:
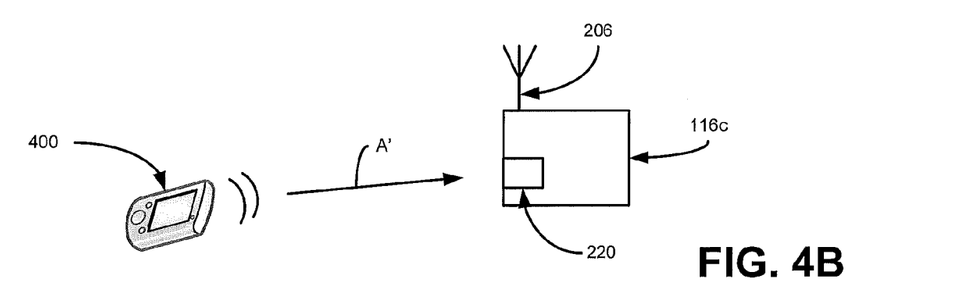

FIGS. 4A and 4B illustrate an exemplary binding operation that may be implemented utilizing the portable device 400 in connection with the building automation system shown in FIG. 1. FIG. 4A illustrates the beginning of a binding operation in which the portable device 400 (which is in this exemplary embodiment is illustrated as a personal digital assistant) communicates with the configured automation component 200. In particular, as indicated by the arrow A, the automation component 200 may utilize the communication port 220 to transmit the assigned component identifier (see block 304 in FIG. 3) to the portable device 400. The portable device 400 may, in turn, be transported to a position near the automation component 116c. It will be understood that the automation component 116c represents any automation component 110, 112 and 116 within communications range of the automation component 200 to which a binding relationship may be established.

FIG. 4B illustrates another portion of the binding operation in which the component identifier associated with the automation component 200 is provided to the automation component 116c. In particular, the component identifier provided by and associated with the automation component 200 may be stored within the memory (not shown) of the portable device 400 and, as indicated by the arrow A', communicated or transmitted to the automation component 116c. The automation component 116c may, in turn, communicate or broadcast a binding request directed to the component identifier of automation component 200.

Figure 5A:
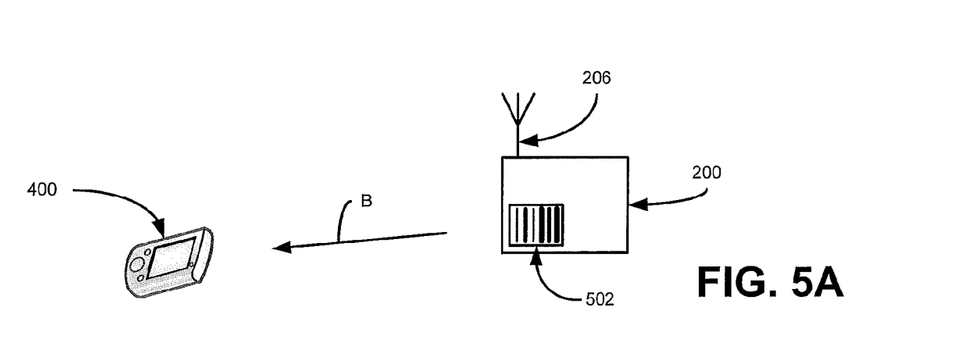
FIGS. 5A and 5B illustrate another exemplary binding operation that may be implemented in connection with the building automation system shown in FIG. 1.
Figure 5B:
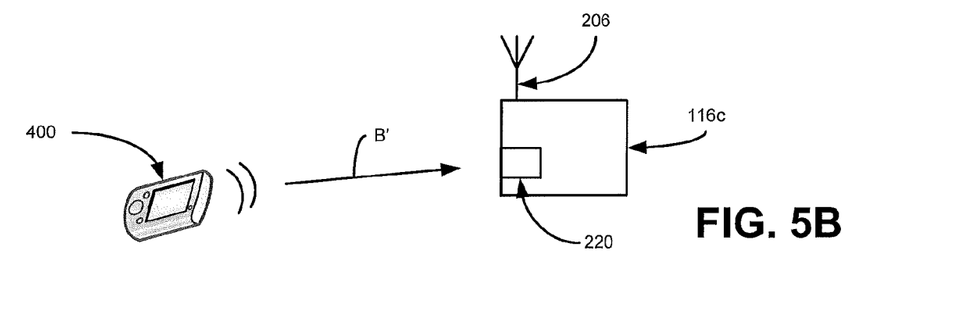

FIGS. 5A and 5B illustrate another exemplary binding operation that may be implemented utilizing the portable device 400. In this exemplary embodiment, the portable device 400 includes a scanner configured for reading a barcode or other machine readable label. For example, the portable device 400 may scan and read a barcode 502 affixed to the component housing 222 of the automation component 200. The barcode 502 may include the component identifier and other setup information associated with the automation component 200. The scanned information may be stored in the memory (not shown) of the portable device 400, and provided to the automation component 116c to which a binding relationship is to be established. The stored information may, for example, be communicated via an infrared transmission from the portable device 400 to the communication port 220. The automation component 116c may, in turn, communicate or broadcast a binding request directed to the component identifier of automation component 200.

Figure 6:
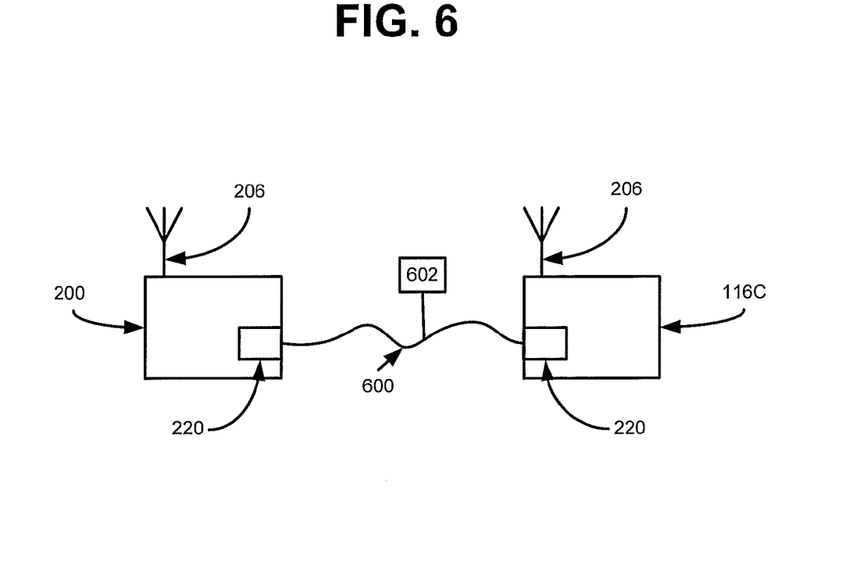
FIG. 6 illustrates another exemplary binding operation that may be implemented in connection with the building automation system shown in FIG. 1.

FIG. 6 illustrates another exemplary binding operation that may be implemented utilizing a smart cable 600. In this exemplary configuration, the smart cable 600 may be connected to the communication port(s) 220 of the automation components 200, 116c. The smart cable 600 may include a controller 602 which may include a processor and/or embedded memory configured to initiate communications between automation components. For example, upon connection of the smart cable 600 to the automation components 200, 116c, the controller 602 may instruct the respective processors 202 to exchange component identifiers. The exchanged identifiers may, in turn, be utilized to establish a binding relationship between the automation components 200, 116c.

Figure 7:
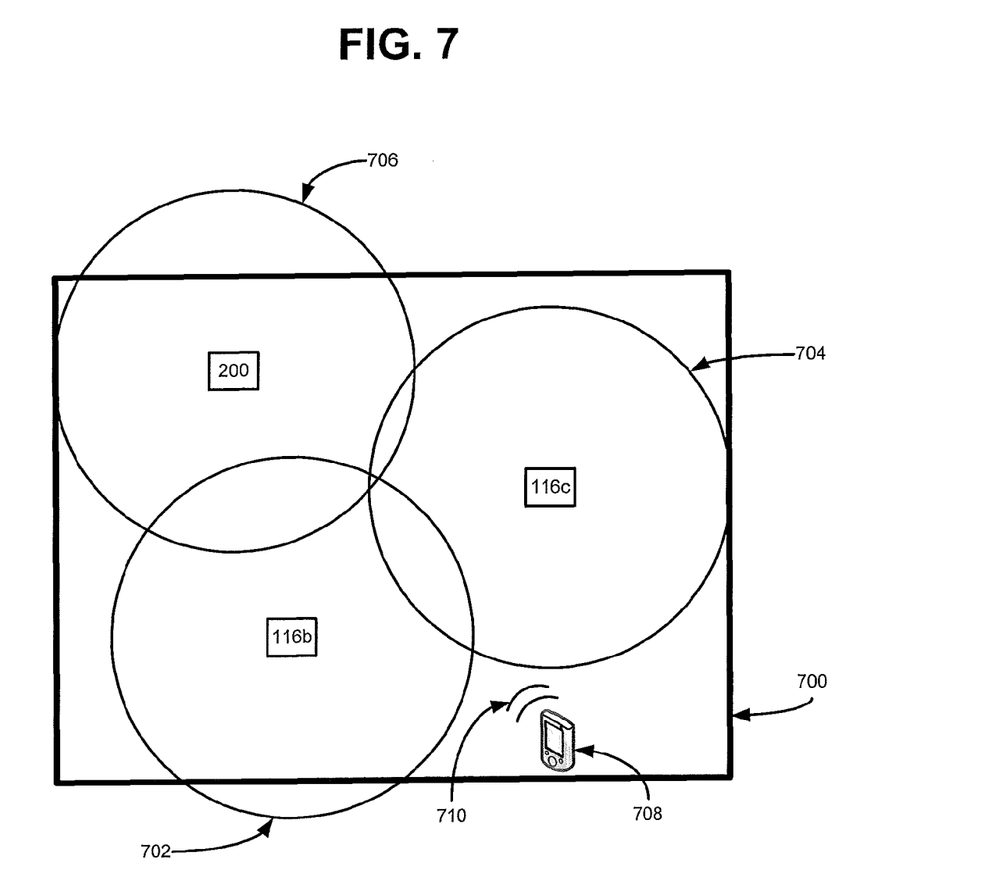
FIG. 7 illustrates an exemplary location based binding operation that may be implemented in connection with the building automation system shown in FIG. 1.

FIG. 7 illustrates an exemplary location based binding operation that may be implemented in connection with the building automation system shown in FIG. 1. In particular, FIG. 7 illustrates a room, space or region 700 within the structure controlled and monitored by the control system 100. The space 700, in this exemplary embodiment, includes automation components 200, 116b and 116c disposed and operating therein. The automation components 116b and 116c are part of the mesh network or subnet 118a. The automation component 200 may represent a full function device, a reduced function device or any other automation component to be integrated into the subnet 118a. Each of the automation components 200, 116b and 116c is a wireless automation component configured to communicate with other automation components within their respective communication ranges. For example, the automation component 116b broadcasts and defines a communication range 702, the automation component 116c broadcasts and defines a communication range 704 which overlaps with the communication range 702. Similarly, automation component 200 broadcasts and defines a communication range 706 which overlaps and may facilitate communications with the automation components 116b and 116c.

A location device 708 may include a global positioning system (GPS) receiver or other real time location system receiver. The GPS receiver may, in turn, allow the location device 700 to determine its position within the space 700. The location device 708 may further include a wireless communication component (see, for example, the communications module 210) configured to allow communication with the automation components 200, 116b and 116c. The location device 708 may be a portable device such as a personal digital assistant or any other mobile device. Alternatively, the location device 708 may fixedly mounted or carried within the space 700.

In operation, the location device 708 may, continuously or at a predefined interval, transmit or broadcast a signal 710 that includes a location and transmit power settings to all of the automation components 200, 116b and 116c within the space 700. The automation components 200, 116b and 116c, in turn, may receive and store the signal 710 including the channel on which the broadcast was communicated, the location information and the received signal strength indicator (RSSI) associated with transmit power settings of the location device 708. Based on the received and stored information, the automation components 200, 116b and 116c may process the location information and the signal strength information to estimate their individual locations within the space 700. The automation components 200, 116b and 116b may further utilize the map information provided during the component setup operation discussed in connection with block 302 (see FIG. 3). The map information or other predefined database of component locations established from the structure may, in turn, be utilized by the automation component 200. For example, the automation component 200 may, based on the estimated position, attempt communications with the automation components 116b and 116c because they are listed in the database or map as being within physical proximity of the automation component 200. The database or map may further include component identifiers for each listed automation component and/or any other binding information necessary for communication. Thus, the automation component 200 may initiate a binding operation with the automation components 116b and the 116b in an attempt to join the mesh network or subnet 118a.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Well understood changes and modifications can be made based on the teachings and disclosure provided by the present invention and without diminishing from the intended advantages disclosed herein. It is therefore intended that such changes and modifications be covered by the appended claims.

What is claimed is:

1. An automation component configured for wireless communication within a building automation system, the automation component comprising:
   a communication module comprising:
      a communication port; and
      a wireless communication component;
      a processor in communication with the communication module; and
      a memory in communication with the processor, the memory configured to store computer readable instructions which are executable by the processor;
   wherein the computer readable instructions are programmed to:
      receive a component identifier via the communications port, wherein the component identifier is associated with another automation component and is provided by the other automation component via a portable device in direct communication with the automation component;
      generate a binding request based on the received component identifier, wherein the binding request includes a handshake query identifying the other automation component;
      communicate the binding request via the wireless communication component to the other automation component; and
      establish, in response to the handshake query, a direct communication link to the other automation component.

2. The automation component of claim 1, wherein the communication port is an infrared port.

3. The automation component of claim 2, wherein the component identifier is provided via a universal remote.

4. The automation component of claim 3, wherein the universal remote includes an infrared communicator compatible with the infrared port of the communication module.

5. The automation component of claim 1, wherein the component identifier is a media access control address of a second automation component.

6. The automation component of claim 1, wherein the communication port is a serial port.

7. The automation component of claim 6 further comprising a serial cable configured for communication via the serial port.

8. The automation component of claim 7, wherein the serial cable includes a controller configured to establish a communication link between the communication module and the other automation component.

9. The automation component of claim 1, wherein the communication port is a bar code device.

10. The automation component of claim 1 further comprising a bar code carried by a component housing wherein the bar code represents the component identifier.

11. A method for binding an automation component within a building automation system, the method comprising:
   receiving a component identifier via a communication port, wherein the component identifier is associated with another automation component and is provided by the other automation component via a portable device in direct communication with the automation component;
   generating a binding request based on the received component identifier, wherein the binding request includes a handshake query associated with the other automation component;
   communicating the binding request via a wireless communication component to the other automation component, wherein the binding request is addressed to the received component identifier; and
   establishing, in response to the handshake query, a direct communication link to the other automation component.

12. The method of claim 11, wherein the communication port include an infrared port.

13. The method of claim 12, wherein the infrared port is configured to receive the component identifier provided by a universal remote control.

14. The method of claim 11, wherein the communication port include a serial port.

15. The method of claim 14, wherein the serial port is configured to receive the component identifier provided by a serial cable.

16. An automation component configured for wireless communication within a structure having a building automation system, the automation component comprising:
   a wireless communication component;
   a processor in communication with the wireless communication component; and
   a memory in communication with the processor, the memory configured to store computer readable instructions which are executable by the processor;
   wherein the computer readable instructions are programmed to:
      receive a location signal;
      receive a signal strength indicator;
      determine a position within the structure as a function of the location signal and the signal strength indicator;
      identify another automation component within a communication range without communicating with the other automation component;
      communicate a binding request to the other automation component, wherein the binding request includes a handshake query associated with the other automation component; and
      establish, in response to the handshake query, a direct communication link to the other automation component.

17. The automation component of claim 16, wherein the location signal is a GPS-compatible signal.

18. The automation component of claim 16, wherein the location signal is provided by a location node in communication with a GPS-compatible device.

19. An automation component configured for wireless communication within structure having a building automation system, the automation component comprising:
   a wireless communication component;
   a location communication component in communication with the wireless communication component, wherein the location communication component is configured to provide a location signal;
   a signal strength indication component in communication with the wireless communication component, wherein the location communication component is configured to provide a signal strength indicator;
   wherein the wireless communication component is configured to communicate a binding request including a handshake query to another automation component within a communication range of the location communication component, the other automation component being identifiable as within a communication range without communicating with the other automation component; and wherein the wireless communication component is configured to establish a direct communication link to the other automation component in response to a reply received in connection with the handshake query.

20. The automation component of claim 19, wherein the location communication component is a GPS-compatible component.

21. A method for binding an automation component within a building automation system, the method comprising:
   receiving a location signal communicated by a location communication component;
   receiving a signal strength indicator communicated by the location communication component;
   determining a position as a function of the location signal and the signal strength indicator;
   communicating a binding request including a handshake query to another automation component within a communication range associated with the position, the other automation component being identifiable as within the communication range without communicating with the other automation component; and
   establishing, upon receipt of a handshake response to the handshake query, a direct communication link to the other automation component.

22. The automation component of claim 21 further comprising:
   identifying the other automation component within the communication range; and
   receiving a binding response communicated by the other automation component.

23. The automation component of claim 21, wherein the location signal is provided by a location node in communication with a GPS-compatible device.

24. The automation component of claim 21, wherein communicating the binding request to the other automation components includes broadcasting the binding request to a plurality of automation components within the communication range associated with the position.

* * * * *